United States Patent
Yamamoto (10) Patent No.: US 12,168,297 B2
(45) Date of Patent: Dec. 17, 2024

(54) ROBOT APPARATUS AND CONTROL METHOD

(71) Applicant: CANON KABUSHIKI KAISHA, Tokyo (JP)

(72) Inventor: Yuya Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 17/167,353

(22) Filed: Feb. 4, 2021

(65) Prior Publication Data
US 2021/0260756 A1 Aug. 26, 2021

(30) Foreign Application Priority Data
Feb. 21, 2020 (JP) .................. 2020-028370

(51) Int. Cl.
| | | |
|---|---|---|
| B25J 9/16 | (2006.01) | |
| B23Q 7/04 | (2006.01) | |
| B25J 13/08 | (2006.01) | |

(52) U.S. Cl.
CPC ............ *B25J 9/1612* (2013.01); *B23Q 7/046* (2013.01); *B25J 9/1638* (2013.01); *B25J 13/085* (2013.01)

(58) Field of Classification Search
CPC ...... B25J 9/1612; B25J 9/1638; B25J 13/085; B25J 9/1694; B25J 9/1633; B25J 9/00; B25J 9/126; B25J 9/1602; B25J 13/02; B23Q 7/046; G05B 2219/40599; G05B 2219/39218; G05B 2219/37344; G05B 2219/40342; A61B 2090/066
See application file for complete search history.

(56) References Cited

U.S. PATENT DOCUMENTS

| | | | |
|---|---|---|---|
| 7,443,115 B2 | 10/2008 | Okamoto et al. | |
| 7,888,900 B2 | 2/2011 | Okamoto et al. | |
| 10,144,464 B1* | 12/2018 | Buerger | ............... F16H 9/04 |
| 2004/0140787 A1* | 7/2004 | Okamoto | ............ B25J 9/1612 |
| | | | 318/568.21 |
| 2009/0018700 A1 | 1/2009 | Okamoto et al. | |
| 2016/0089212 A1 | 3/2016 | Balicki et al. | |
| 2017/0106541 A1 | 4/2017 | Naitou et al. | |
| 2019/0126483 A1* | 5/2019 | Haddadin | ............ B25J 9/1669 |
| 2019/0254762 A1* | 8/2019 | Overmyer | ............ A61B 34/37 |
| 2020/0122323 A1* | 4/2020 | Inaba | ................. B25J 9/1694 |

(Continued)

FOREIGN PATENT DOCUMENTS

| | | | | |
|---|---|---|---|---|
| CN | 106715057 A | | 5/2017 | |
| DE | 102015210218 A1 * | | 12/2016 | ......... G05B 19/423 |

(Continued)

OTHER PUBLICATIONS

Translation of DE-102015210218-A1.*

(Continued)

*Primary Examiner* — Abby Y Lin
*Assistant Examiner* — Esvinder Singh
(74) *Attorney, Agent, or Firm* — Venable LLP (57) ABSTRACT

A robot apparatus includes a robot arm, an end effector provided in the robot arm and configured to hold a workpiece, and a controller configured to perform a control process for controlling the end effector to release the workpiece on a basis of a first torque acting on the end effector in a predetermined direction in a state in which the end effector is holding the workpiece.

32 Claims, 9 Drawing Sheets

(56) References Cited

U.S. PATENT DOCUMENTS

| | | | | |
|---|---|---|---|---|
| 2020/0147787 A1* | 5/2020 | Takahashi | .............. | B25J 9/0081 |
| 2021/0169596 A1* | 6/2021 | Urvoy | ................ | A61B 17/1626 |
| 2021/0394362 A1* | 12/2021 | Sodeyama | ............. | B25J 13/082 |
| 2022/0274262 A1* | 9/2022 | Nagakari | ................ | B25J 15/08 |

FOREIGN PATENT DOCUMENTS

| | | |
|---|---|---|
| JP | H10-329071 A | 12/1998 |
| JP | 2000-176872 A | 6/2000 |
| JP | 2004-167674 A | 6/2004 |
| JP | 2008-200847 A | 9/2008 |
| JP | 2017-074660 A | 4/2017 |
| JP | 2019-018340 A | 2/2019 |
| WO | 2019/017416 A1 | 1/2019 |

OTHER PUBLICATIONS

Jun. 16, 2023 Office Action in Chinese Patent Application No. 202110193385.8.

Dec. 5, 2023 Office Action in Japanese Patent Application No. 2020-028370 (with English translation).

\* cited by examiner

ROBOT APPARATUS AND CONTROL METHOD

BACKGROUND OF THE INVENTION

Field of the Invention

The present invention relates to robot technology.

Description of the Related Art

Today, robots including a robot arm and an end effector are widely used in factories and the like for automation of production. In particular, robots that cooperate with people are increasingly used. As an example of a cooperative work between a person and a robot, an operation of directly passing a workpiece held by an end effector to a person can be mentioned. Japanese Patent Laid-Open No. 2008-200847 discloses control of a robot in an operation of passing a workpiece from the robot to a person.

In the operation of passing a workpiece from a robot to a person, it is required to make sure that the workpiece is passed to the person without the robot dropping the workpiece. Further, there is a demand that the takt time in such a passing operation is shortened.

SUMMARY OF THE INVENTION

According to a first aspect of the present invention, a robot apparatus includes a robot arm, an end effector provided in the robot arm and configured to hold a workpiece, and a controller configured to perform a control process for controlling the end effector to release the workpiece on a basis of a first torque acting on the end effector in a predetermined direction in a state in which the end effector is holding the workpiece.

According to a second aspect of the present invention, an interface apparatus is configured to transmit a command to release a workpiece to an end effector holding the workpiece. The command is transmitted on a basis of a torque applied to the end effector in a predetermined direction by a user's operation.

According to a third aspect of the present invention, a control apparatus is configured to control an end effector holding a workpiece to release the workpiece, on a basis of a torque acting on the end effector in a predetermined direction in a state in which the end effector is holding the workpiece.

According to a fourth aspect of the present invention, an end effector is provided in a robot arm and is configured to hold a workpiece. The workpiece is released on a basis of a torque acting on the end effector in a predetermined direction in a state of holding the workpiece.

According to a fifth aspect of the present invention, a control method for controlling an end effector provided in a robot arm and configured to hold a workpiece includes causing the end effector to hold the workpiece, and controlling the end effector to release the workpiece, on a basis of a torque acting on the end effector in a predetermined direction.

Further features of the present invention will become apparent from the following description of exemplary embodiments with reference to the attached drawings.

DESCRIPTION OF THE EMBODIMENTS

Embodiments of the present invention will be described in detail below with reference to drawings.

First Embodiment

Figure 1:
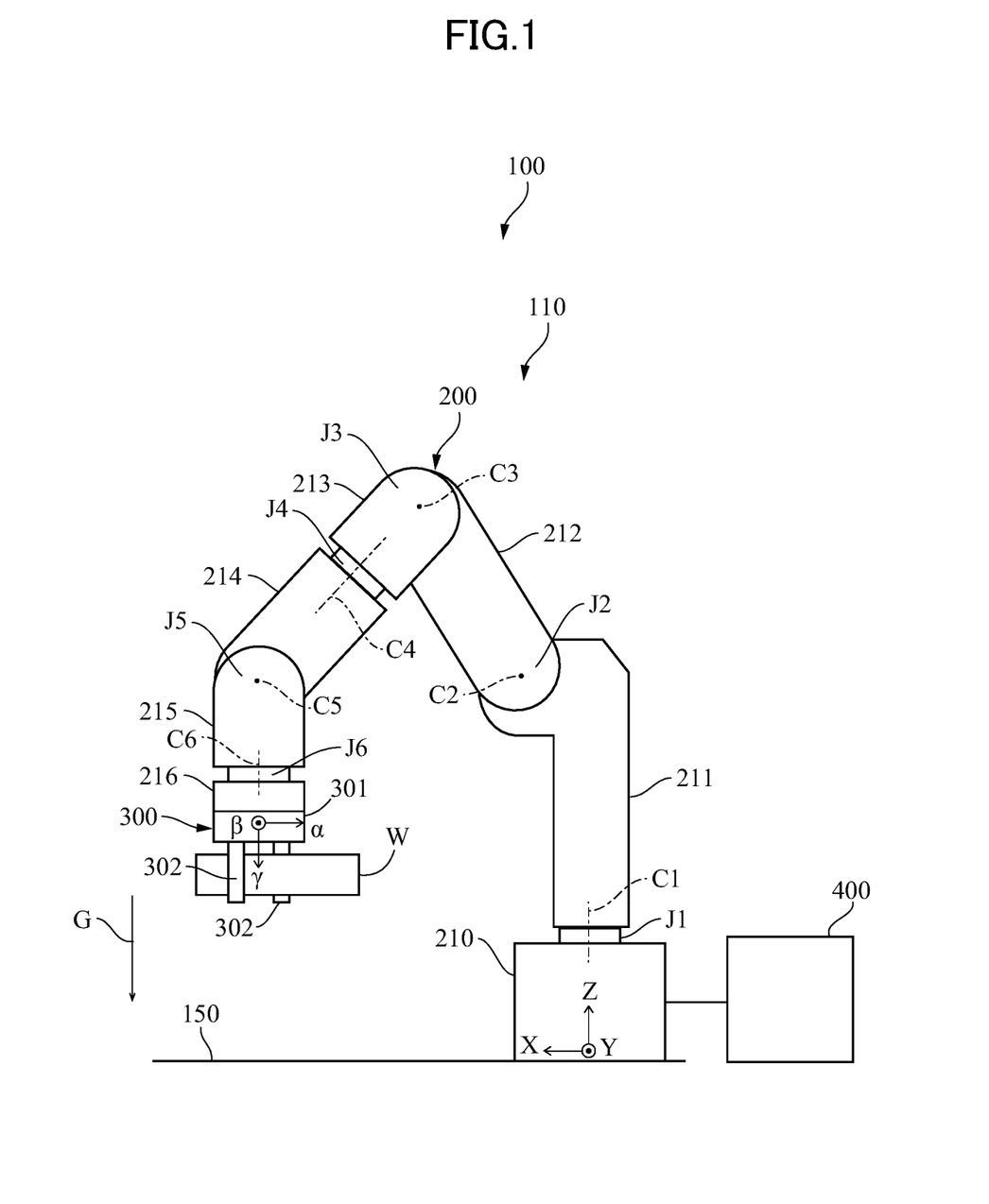
FIG. 1 is an explanatory diagram of a robot apparatus according to a first embodiment.

FIG. 1 is an explanatory diagram of a robot apparatus 100 according to a first embodiment. The robot apparatus 100 includes a robot 110, and a control apparatus 400 serving as an example of an interface apparatus. The robot 110 is a manipulator and includes a robot arm 200 and a robot hand 300 serving as an example of an end effector. The robot hand 300 is provided on the robot arm 200. The control apparatus 400 controls the robot arm 200 and the robot hand 300. The robot hand 300 holds a workpiece W such as a part or a tool.

For example, the robot arm 200 is a vertically articulated robot arm. The robot arm 200 includes a plurality of links. For example, the robot arm 200 includes seven links 210 to 216. The plurality of links 210 to 216 are rotatably interconnected by a plurality of joints. For example, the plurality of links 210 to 216 are rotatably interconnected by six joints J1 to J6. The plurality of links 210 to 216 are interconnected in series.

Specifically, the link 211 is connected to the link 210 via the joint J1 so as to be rotatable about an axis C1 with respect to the link 210. The link 212 is connected to the link 211 via the joint J2 so as to be rotatable about an axis C2 with respect to the link 211. The link 213 is connected to the link 212 via the joint J3 so as to be rotatable about an axis C3 with respect to the link 212. The link 214 is connected to the link 213 via the joint J4 so as to be rotatable about an axis C4 with respect to the link 213. The link 215 is connected to the link 214 via the joint J5 so as to be rotatable about an axis C5 with respect to the link 214. The link 216 is connected to the link 215 via the joint J6 so as to be rotatable about an axis C6 with respect to the link 215.

Among the plurality of links 210 to 216, the link 210 serving as a base portion positioned at the root end is fixed to a stand 150. Among the plurality of links 210 to 216, the robot hand 300 is fixed to the link 216 serving as a flange portion positioned at the distal end. Therefore, by changing the orientation of the robot arm 200, the robot hand 300 can be moved to an arbitrary position within a movable range. Particularly, the robot hand 300 can be rotated together with the link 216 by rotating the link 216 with respect to the link 215. To be noted, although the robot hand 300 is directly connected to the link 216 in the first embodiment, an additional member may be provided between the robot hand 300 and the link 216.

Here, a coordinate system based on the link 210, that is, a global coordinate system based on the installation environment is defined as an XYZ coordinate system. The XYZ coordinate system is an orthogonal coordinate system. The Z axis is an axis extending in a direction parallel to a gravity direction G. The X axis and the Y axis are axes perpendicular to the Z axis. A local coordinate system based on the robot hand 300 is defined as an αβγ coordinate system. The αβγ coordinate system is an orthogonal coordinate system. The γ axis is an axis extending in a direction parallel to the axis C6. The α axis and the β axis are axes perpendicular to the γ axis.

The robot hand 300 is configured to hold the workpiece W. The robot hand 300 includes a hand body 301, and a plurality of fingers openably and closably supported by the hand body 301. For example, the robot hand 300 includes two fingers 302. The hand body 301 is fixed to the link 216. The two fingers 302 can move close to and away from each other, that is, open and close to hold and release the workpiece W.

Figure 2:
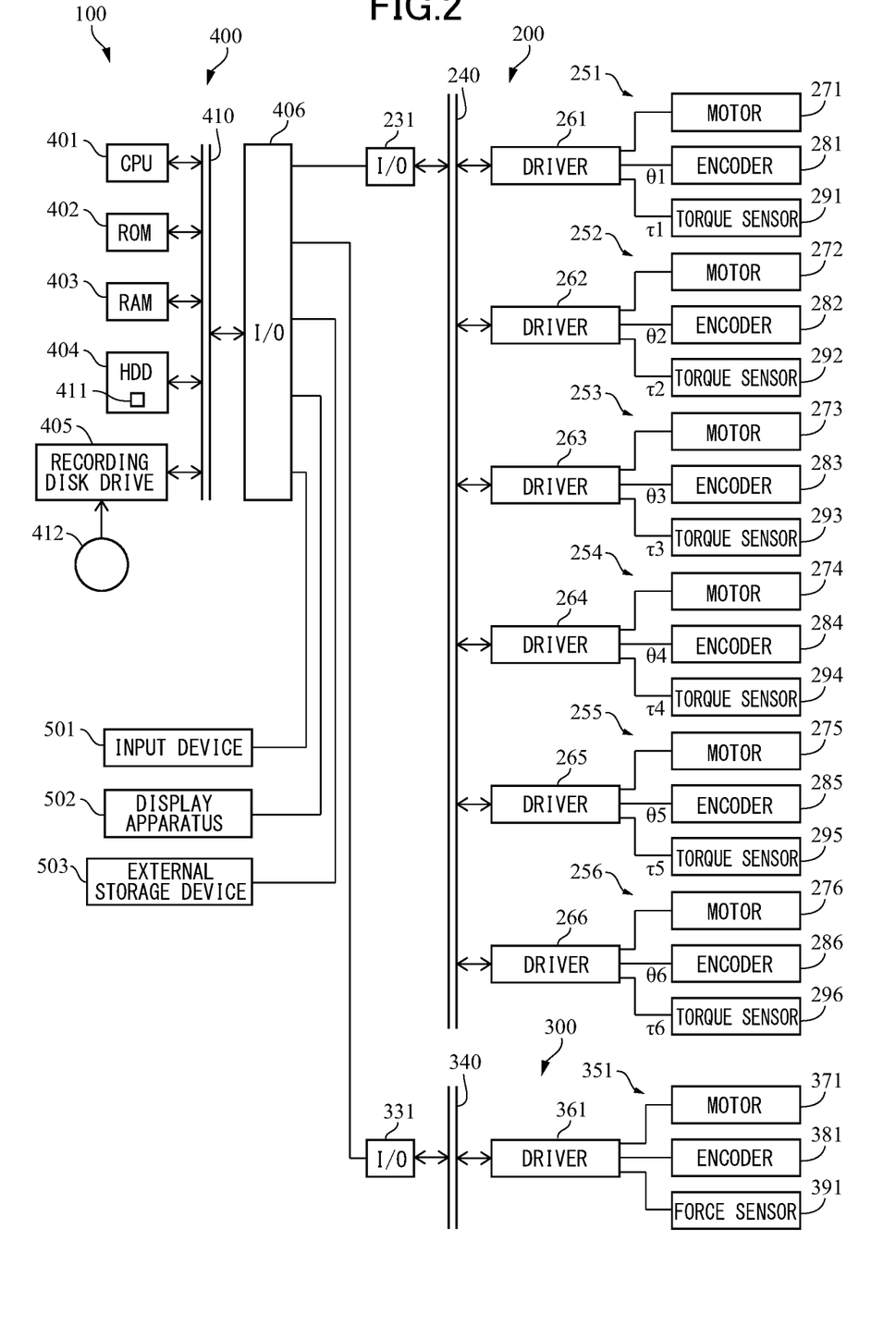
FIG. 2 is a block diagram illustrating a control system of the robot apparatus according to the first embodiment.

FIG. 2 is a block diagram illustrating a control system of the robot apparatus 100 according to the first embodiment. The control apparatus 400 is constituted by a computer, and includes a central processing unit: CPU 401 that is a processor. The CPU 401 serves as an example of a controller. In addition, the control apparatus 400 includes a read-only memory: ROM 402 and a hard disk drive: HDD 404 as storage portions. In addition, the control apparatus 400 includes a recording disk drive 405 and an I/O 406 serving as an input/output interface. The CPU 401, the ROM 402, the HDD 404, the recording disk drive 405, and the I/O 406 are communicably interconnected via a bus 410.

The ROM 402 is a non-transitory storage device. The ROM 402 stores a basic program that is read out by the CPU 401 when turning the computer on. The RAM 403 is a transitory storage device used for computation by the CPU 401. The HDD 404 is a non-transitory storage device that stores various data such as results of computation by the CPU 401. In the first embodiment, the HDD 404 stores a program 411 for causing the CPU 401 to execute a control method that will be described later. The recording disk drive 405 can read out various data, programs, and the like recorded in a recording disk 412.

The I/O 406 is connected to the robot arm 200, the robot hand 300, an input device 501, a display apparatus 502, and an external storage device 503.

The input device 501 is an apparatus with which an operator can input data, for example, a teaching device such as a teaching pendant. The teaching pendant is operated by the operator to teach a position of the robot arm 200 or the robot hand 300. The display apparatus 502 is a display that displays various images under control of the CPU 401. The external storage device 503 is a non-transitory storage device such as an HDD or a universal serial bus: USB memory.

The robot arm 200 includes an I/O 231 that is an input/output interface, and a plurality of driving units. In the first embodiment, the robot arm 200 includes driving units of the same number as the joints, that is, six driving units 251 to 256. The driving units 251 to 256 respectively correspond to the joints J1 to J6.

The driving unit 251 includes a driver 261, a motor 271, an encoder 281, and a torque sensor 291. The driving unit 252 includes a driver 262, a motor 272, an encoder 282, and a torque sensor 292. The driving unit 253 includes a driver 263, a motor 273, an encoder 283, and a torque sensor 293. The driving unit 254 includes a driver 264, a motor 274, an encoder 284, and a torque sensor 294. The driving unit 255 includes a driver 265, a motor 275, an encoder 285, and a torque sensor 295. The driving unit 256 includes a driver 266, a motor 276, an encoder 286, and a torque sensor 296.

The drivers 261 to 266 each include an unillustrated microcomputer, an unillustrated A/D conversion circuit, an unillustrated motor driving circuit, and so forth. The plurality of drivers 261 to 266 and the I/O 231 are communicably interconnected via a bus 240. The I/O 231 is communicably connected to the I/O 406 of the control apparatus 400. The drivers 261 to 266 may be each disposed at any position. For example, the drivers 261 to 266 are each disposed in one of the links of the robot arm 200.

The driving units 251 to 256 each have substantially the same configuration and function. The motors 271 to 276 respectively drive the joints J1 to J6. Specifically, the motors 271 to 276 each drive, directly or via an unillustrated transmission mechanism such as a reduction gear, the link on the distal end side with respect to the link on the root end side among two links interconnected by corresponding one of the joints J1 to J6. The encoders 281 to 286 are rotary encoders that are sensors that respectively output signals corresponding to the rotational positions, that is, rotation angles θ1 to θ6 of rotation shafts of the respective motors 271 to 276. The torque sensors 291 to 296 are respectively disposed in the joints J1 to J6. The torque sensors 291 to 296 are each a sensor that outputs a signal corresponding to a torque acting on the link on the distal end side with respect to the link on the root end side among two links interconnected by corresponding one of the joints J1 to J6. That is, the torque sensors 291 to 296 respectively output signals corresponding to torques τ1 to τ6 respectively acting on the joints J1 to J6. Particularly, the torque sensor 296 is a sensor that outputs a signal corresponding to the torque τ6 acting on the robot hand 300 in the rotation direction about the axis C6 illustrated in FIG. 1.

The drivers 261 to 266 respectively receive signals from the encoders 281 to 286 at predetermined periodicity, and convert the signals into digital signals respectively indicating the rotation angles θ1 to θ6. In addition, the drivers 261 to 266 respectively receive signals from the torque sensors 291 to 296 at predetermined periodicity, and convert the signals into digital signals respectively indicating the torques τ1 to τ6.

In addition, the drivers 261 to 266 respectively control the motors 271 to 276 on the basis of difference between respective angle command values and the respective rotation angles θ1 to θ6 in the case where the drivers 261 to 266 have received the respective angle command values from the CPU 401 of the control apparatus 400. As a result of this, the rotation angles θ1 to θ6 of the motors 271 to 276 can be made closer to the respective angle command values. In addition, the drivers 261 to 266 respectively control the motors 271 to 276 on the basis of difference between respective torque command values and the respective torques τ1 to τ6 in the case where the drivers 261 to 266 have received the respective torque command values from the CPU 401 of the control apparatus 400. As a result of this, the torques τ1 to τ6 acting on the joints J1 to J6 can be made closer to the respective torque command values. The control described above is performed periodically at predetermined periodicity.

Therefore, the CPU 401 of the control apparatus 400 can control the orientation of the robot arm 200 by transmitting angle command values to the drivers 261 to 266. This control will be referred to as position control. In addition, the CPU 401 of the control apparatus 400 can control the force of the robot hand 300 by transmitting torque command values to the drivers 261 to 266. This control will be referred to as torque control or force control.

The robot hand 300 includes an I/O 331 that is an input/output interface, and a driving unit 351. The driving unit 351 includes a driver 361, a motor 371, an encoder 381, and a force sensor 391. The driver 361 includes an unillustrated microcomputer, an unillustrated A/D conversion circuit, an unillustrated motor driving circuit, and so force. The driver 361 and the I/O 331 are communicably interconnected by a bus 340. The I/O 331 is communicably connected to the I/O 406 of the control apparatus 400. The driver 361 may be disposed at any position. For example, the driver 361 is disposed in the hand body 301.

The motor 371 drives the plurality of fingers 302 illustrated in FIG. 1. Specifically, the motor 371 drives the plurality of fingers 302 to open or close the plurality of fingers 302 directly or via an unillustrated transmission mechanism such as a rack-and-pinion mechanism. The encoder 381 is a rotary encoder that is a sensor that outputs a signal corresponding to the rotational position, that is, the rotation angle of the rotation shaft of the motor 371. The force sensor 391 is a sensor that outputs a signal corresponding to the force acting on the plurality of fingers 302, that is, the force of holding the workpiece W.

The driver 361 receives a signal from the encoder 381 at predetermined periodicity and converts the signal into a digital signal indicating the rotation angle. The driver 361 receives a signal from the force sensor 391 at predetermined periodicity and converts the signal into a digital signal indicating the force. The driver 361 transmits the digital signal indicating the rotation angle and the digital signal indicating the force to the CPU 401 and the control apparatus 400.

In addition, the driver 361 controls the motor 371 on the basis of difference between an angle command value and the rotation angle of the motor 371 based on the signal from the encoder 381 in the case where the driver 361 has received the angle command value from the CPU 401 of the control apparatus 400. As a result of this, the rotation angle of the motor 371 can be made closer to the angle command value. That is, the positions of the plurality of fingers 302 in an opening/closing direction are controlled. That is, the opening/closing operation of the plurality of fingers 302 is controlled. In addition, the driver 361 controls the motor 371 on the basis of difference between a force command value and the force based on the signal from the force sensor 391 in the case where the driver 361 has received the force command value from the CPU 401 of the control apparatus 400. As a result of this, the force of the fingers 302 holding the workpiece W is made closer to the force command value. The control described above is periodically performed at predetermined periodicity.

Therefore, the CPU 401 of the control apparatus 400 can control the robot hand 300 holding and releasing the workpiece W by transmitting the angle command value to the driver 361. In addition, the CPU 401 of the control apparatus 400 can control the force of the robot hand 300 holding the workpiece W by transmitting the force command value to the driver 361.

To be noted, although a case where the HDD 404 serves as a non-transitory computer-readable recording medium storing the program 411 will be described in the first embodiment, the configuration is not limited to this. The program 411 may be recorded in any recording medium as long as the recording medium is a non-transitory computer-readable recording medium. For example, the ROM 402, the recording disk 412, the external storage device 503, or the like may be used as the recording medium storing the program 411. Specific examples of this recording medium include flexible disks, hard disks, optical disks, magnetophot disks, CD-ROMs, CD-Rs, magnetic tapes, nonvolatile memories, and ROMs.

Figure 3A:
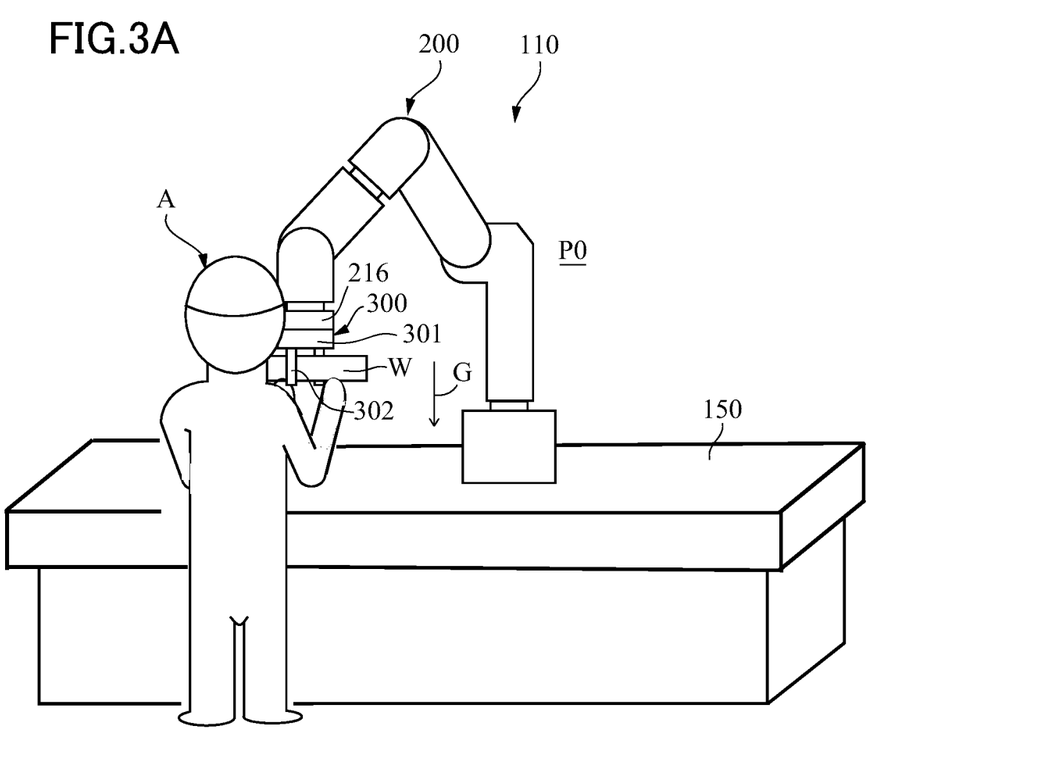
FIG. 3A is a schematic diagram illustrating a cooperative work between the robot and an operator according to the first embodiment.

FIG. 3A is a schematic diagram illustrating a cooperative work between the robot 110 and an operator A in the first embodiment. The operator A is a user. Examples of the cooperative work include an operation of passing the workpiece W from the robot 110 to the operator A as illustrated in FIG. 3A. When passing the workpiece W from the robot 110 to the operator A, it is preferable that the robot 110 releases the workpiece W in a state in which the operator A is securely supporting the workpiece W. This is because particularly in the case where the workpiece W is a heavy object, all the weight of the workpiece W is put on the operator A when the robot 110 releases the workpiece W, and thus the operator A needs to be prepared for this weight.

When passing the workpiece W from the robot 110 to the operator A, the robot arm 200 is maintained in a predetermined orientation P0. The predetermined orientation P0 is an orientation in which the workpiece W is passed to the operator A. For example, the predetermined orientation P0 is an orientation in which the robot hand 300 is below the link 216 that is the distal end of the robot arm 200 in the gravity direction G, that is, an orientation in which the fingers 302 are below the hand body 301 in the gravity direction G.

Figure 3B:
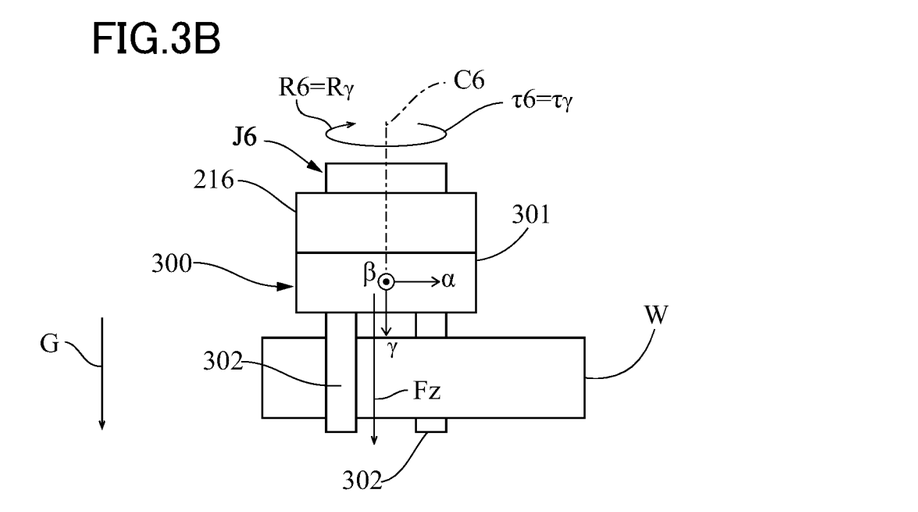
FIG. 3B is a schematic enlarged view of the vicinity of a robot hand of the robot according to the first embodiment.

FIG. 3B is an enlarged schematic view of the vicinity of the robot hand 300 in the robot 110 illustrated in FIG. 3A. A force Fz acts in the gravity direction G on the robot hand 300, that is, on the link 216 of the robot arm 200 due to the weight of the robot hand 300 and the weight of the workpiece W. The gravity direction G and the direction in which the $\gamma$ axis extends are parallel to each other. The robot hand 300 is rotatable in a rotation direction R6 about the axis C6. The rotation direction R6 about the axis C6 is the same as a rotation direction R$\gamma$ about the $\gamma$ axis. Further, the torque $\tau 6$ in the rotation direction R6 is the same as a torque $t\gamma$ in the rotation direction R$\gamma$. The rotation direction R6, that is, the rotation direction R$\gamma$ serves as a predetermined direction.

In the first embodiment, the control apparatus 400 causes the robot hand 300 to release the workpiece W when it is detected that the workpiece W has been twisted by the operator A. Twisting the workpiece W means applying a torque equal to or greater than a threshold value to the workpiece W about the $\gamma$ axis, and includes a case where the robot hand 300 does not rotate due to the position control of the robot arm 200.

In the case where the workpiece W is a heavy object, the operator A supports the workpiece W by both hands as illustrated in FIG. 3A. Since the operator A is using both hands, it is difficult for the operator A to additionally operate a button. In the first embodiment, the operator A can, by twisting the workpiece W, notify the control apparatus 400 that the operator A is ready to support the workpiece W to receive the workpiece W.

Figure 4:
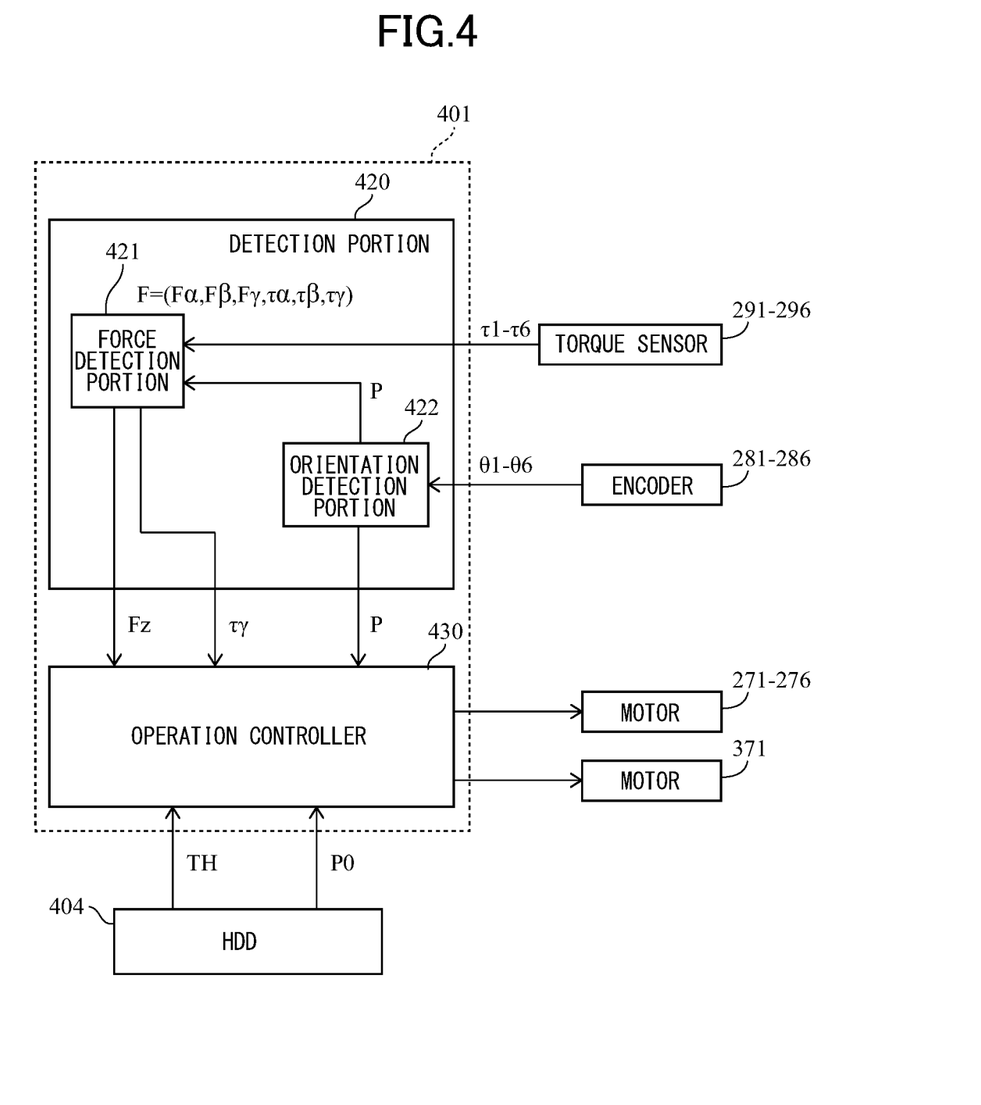
FIG. 4 is a block diagram for describing functions of a control apparatus according to the first embodiment.

FIG. 4 is a block diagram for describing functions of the control apparatus according to the first embodiment. The CPU 401 illustrated in FIG. 2 executes the program 411, and thus functions as a detection portion 420 and an operation controller 430 illustrated in FIG. 4. To be noted, although a case where the functions of the detection portion 420 and the operation controller 430 are realized by the single CPU 401 will be described, the functions of the detection portion 420 and the operation controller 430 may be realized by a plurality of CPUs. In addition, although a case where the CPU 401 realizes the functions of the detection portion 420 and the operation controller 430 with software will be described, the detection portion 420 and the operation controller 430 may be realized by a circuit configuration, that is, a hardware configuration. In addition, FIG. 4 is a diagram for describing the flow of control, and illustration of the drivers 261 to 266 and 361 is omitted. The detection portion 420 includes a force detection portion 421 and an orientation detection portion 422.

The orientation detection portion 422 obtains information of the rotation angles θ1 to θ6 that is a detection result of the encoders 281 to 286. The orientation detection portion 422 detects an orientation P of the robot arm 200 on the basis of the information of the rotation angles θ1 to θ6 and size information of the robot 110. In the first embodiment, the detection of the orientation P of the robot arm 200 involves computation. For example, this computation includes calculation of forward kinematics of the robot. To be noted, the size information of the robot 110 is registered in advance in the HDD 404 illustrated in FIG. 2.

The force detection portion 421 obtains information of the torques τ1 to τ6 that is a detection result of the torque sensors 291 to 296, and information of the orientation P of the robot arm 200. The force detection portion 421 detects a force F acting on the robot hand 300 on the basis of the information of the torques τ1 to τ6, the information of the orientation P, and information of the weight of each portion of the robot 110. In the first embodiment, the detection of the force F involves computation. The force F is a six-dimensional force vector in the αβγ coordinate system, and includes three translational forces Fα, Fβ, and Fγ in the respective axes α, β, and γ, and three rotational forces about the respective axes α, β, and γ, that is, three torques tα, TB, and ty. To be noted, the information of the weight of each portion of the robot 110 is registered in advance in the HDD 404 illustrated in FIG. 2.

The force detection portion 421 detects the force Fz acting on the robot hand 300 in the gravity direction G on the basis of the information of the force F. To be noted, if the robot arm 200 is controlled to a predetermined orientation P0, the force Fz in the gravity direction G is the force Fγ. When the robot arm 200 is in the predetermined orientation P0, the other forces than the force Fz are 0 if no external force is applied to the robot 110.

The detection portion 420 outputs the information of the orientation P of the robot arm 200, the information of the torque tγ acting on the robot hand 300, and the information of the force Fz acting on the robot hand 300 in the gravity direction G to the operation controller 430.

Figure 5:
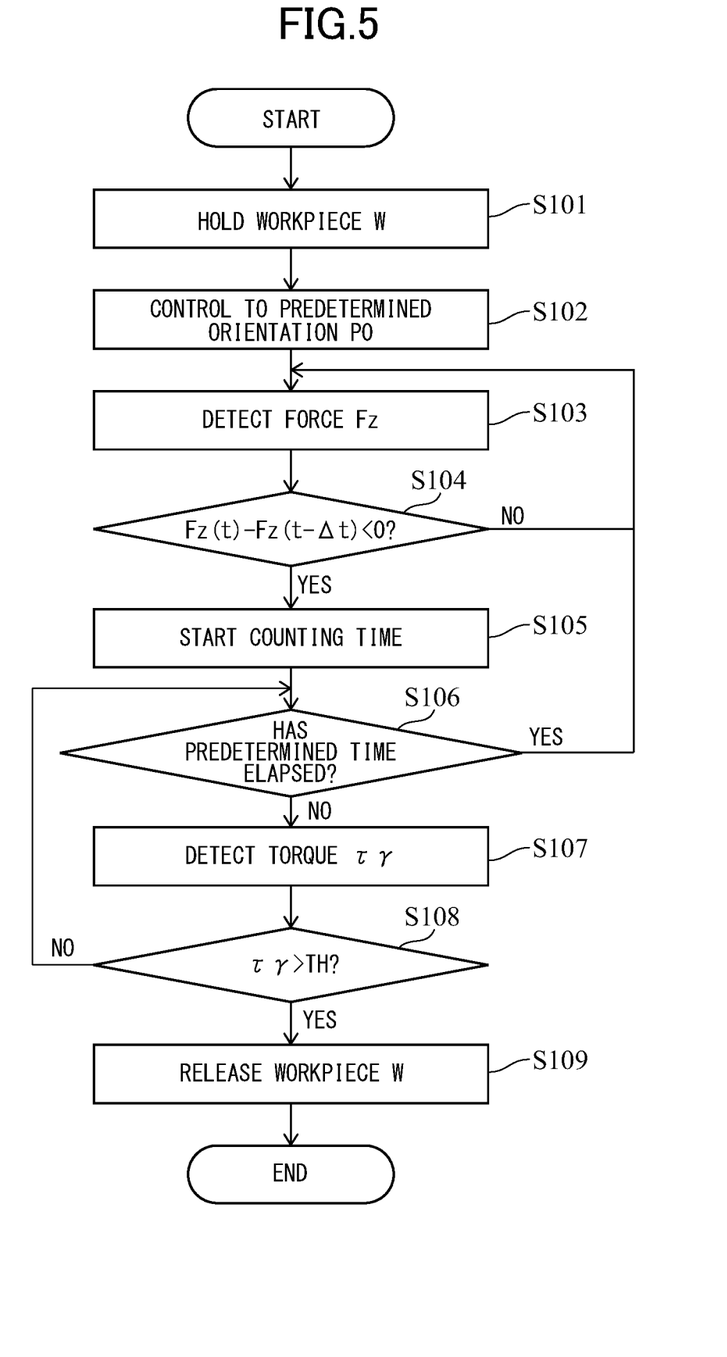
FIG. 5 is a flowchart of a control method according to the first embodiment.

FIG. 5 is a flowchart of a control method according to the first embodiment. The CPU 401 executes the program 411, and thus functions as the detection portion 420 and the operation controller 430 illustrated in FIG. 4 to execute steps S101 to S109 of the control method illustrated in FIG. 5.

In step S101, the operation controller 430 controls the motor 371 to cause the robot hand 300 to hold the workpiece W.

Next, in step S102, the operation controller 430 controls the motors 271 to 276 of the robot arm 200 such that the orientation of the robot arm 200 is the predetermined orientation P0 serving as a target orientation in a state in which the robot hand 300 is holding the workpiece W. According to this position control, the robot arm 200 is positioned in the predetermined orientation P0, and is then maintained in the predetermined orientation P0. Further, even if an external force is applied to the robot 110, the robot arm 200 is maintained in the predetermined orientation P0 against the external force due to the position control. The predetermined orientation P0 is an orientation in which the workpiece W is passed to the operator A as illustrated in FIG. 3A. Information of the predetermined orientation P0 is set in advance in the HDD 404. As a result of this processing of step S102, the robot arm 200 is maintained still in the predetermined orientation P0. As a result of the robot arm 200 maintained still in the predetermined orientation P0, that is, as a result of temporarily stopping the robot arm 200 in the predetermined orientation P0, the operator A can recognize that the operator A can receive the workpiece W from the robot 110.

In step S103, the detection portion 420 detects the force Fz acting on the robot hand 300 in the gravity direction G. In this step S103, the detection portion 420 detects the force Fz in the state in which the robot hand 300 is holding the workpiece W after the operation controller 430 has controlled the robot arm 200 to the predetermined orientation P0 in step S102. The operation controller 430 obtains the information of the force Fz from the detection portion 420. Here, the force Fz at a time t will be referred to as a force Fz(t). In the first embodiment, the detection portion 420 detects the force Fz at a predetermined period Δt. That is, the operation controller 430 obtains the information of the force Fz from the detection portion 420 each time the predetermined period Δt elapses.

In step S104, the operation controller 430 compares the force Fz(t) with a force Fz(t−Δt). For example, the operation controller 430 determines whether Fz(t)−Fz(t−Δt)<0 holds. The force Fz(t−Δt) is the force Fz obtained in the last cycle before the force Fz(t). That is, the operation controller 430 determines whether or not the force Fz in the gravity direction G has decreased from the state in which the robot arm 200 has been controlled to the predetermined orientation P0. The force Fz detected when the operator A supports the workpiece W from below is smaller than the force Fz detected when the robot arm 200 has stopped in the predetermined orientation P0. That is, in step S104, the operation controller 430 determines whether or not the operator A is supporting the workpiece W.

In the case where Fz(t)−Fz(t−Δt)>0 holds, that is, in the case where the force Fz has not decreased and the result of step S104 is NO, the operator A is not sufficiently supporting the workpiece W, and therefore the operation controller 430 returns to the processing of step S103.

In the case where Fz(t)−Fz(t−Δt)<0 holds, that is, in the case where the force Fz has decreased and the result of step S104 is YES, the operation controller 430 starts counting time in step S105.

In step S106, the operation controller 430 determines whether or not a predetermined time has elapsed since the start of time counting, and in the case where the predetermined time has elapsed, that is, in the case where the result of step S106 is YES, the operation controller 430 returns to the processing of step S103.

In the case where the predetermined time has not elapsed, that is, in the case where the result of step S106 is NO, the detection portion 420 detects the torque tγ acting on the robot hand 300 in the rotation direction Rγ in step S107. In this step S106, the robot hand 300 is holding the workpiece W. The operation controller 430 obtains the information of the torque tγ from the detection portion 420. The detection portion 420 detects the torque tγ at the predetermined period Δt. That is, the operation controller 430 obtains the information of the torque tγ from the detection portion 420 each time the predetermined period Δt elapses.

In step S108, the operation controller 430 determines whether or not the torque tγ exceeds a threshold value TH serving as a predetermined value. The threshold value TH is a value set in advance in the HDD 404.

In step S108, the operation controller 430 determines whether or not the operator A has twisted the workpiece W held by the robot hand 300. In the first embodiment, the operation controller 430 controls the robot arm 200 in step S102 such that the robot arm 200 maintains the predetermined orientation P0. Therefore, the orientation of the robot arm 200 is maintained in the predetermined orientation P0 even if the operator A twists the workpiece W, that is, even if the torque tγ is applied to the robot hand 300.

In the case where the torque tγ does not exceed the threshold value TH, that is, in the case where tγ≤ TH holds and the result of step S108 is NO, the operation controller 430 returns to the processing of step S106. In the case where the predetermined time has elapsed without the torque tγ exceeding the threshold value TH, that is, in the case where the result of step S106 is YES, the operation controller 430 returns to the processing of step S103. That is, the process returns to step S103 if the operator A does not rotate the workpiece W for a certain time.

In the case where the torque tγ exceeds the threshold value TH, that is, in the case where tγ>TH holds and the result of step S108 is YES, the operation controller 430 controls the motor 371 of the robot hand 300 in step S109 such that the robot hand 300 releases the workpiece W. The series of operations from step S105 to step S109 serve as a control process. As the control process, the operation controller 430 controls the robot hand 300 to release the workpiece W on the basis of the torque t. Further, in steps S102 to S109, the operation controller 430 controls the robot arm 200 by position control.

As described above, the workpiece W is released from the robot hand 300 by the operator A just performing a simple operation of twisting the robot hand 300 while supporting the workpiece W. Therefore, even when the operator A cannot use either of the hands, the operator A can easily notify the control apparatus 400 that the operator A is ready for receiving the workpiece W without performing an operation such as pushing a button. The control apparatus 400 can reliably pass the workpiece W from the robot 110 to the operator A by using the operation on the workpiece W by the operator A as a trigger for opening the robot hand 300. Further, since the operation of passing the workpiece W is performed in response to the operation by the operator A, an additional waiting time does not have to be provided, and therefore the takt time of the operation of passing the workpiece W can be shortened.

Second Embodiment

Figure 6:
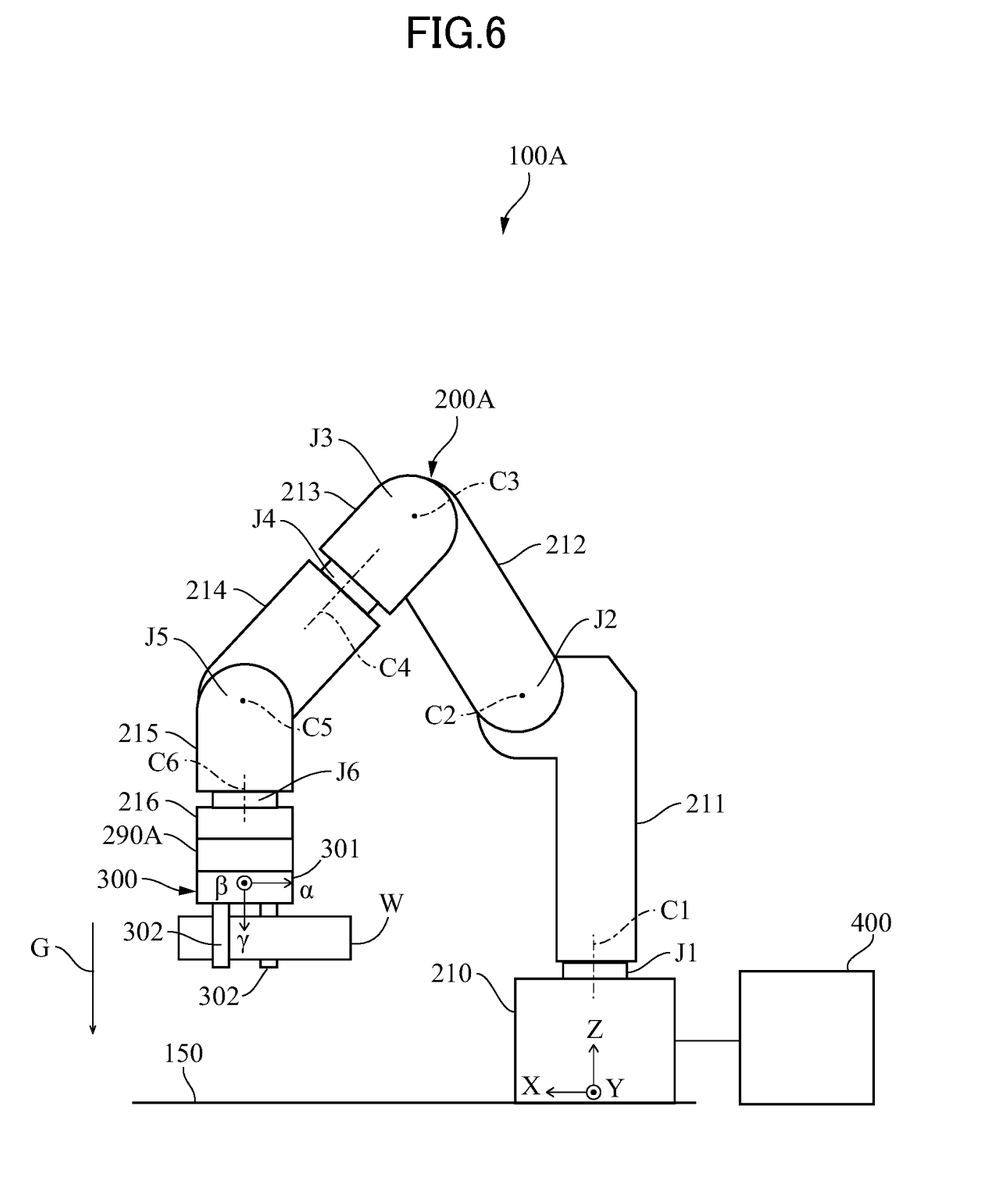
FIG. 6 is an explanatory diagram of a robot apparatus according to a second embodiment.

Next, a second embodiment will be described. FIG. 6 is an explanatory diagram of a robot apparatus 100A according to the second embodiment. In the first embodiment described above, a case where the control apparatus 400 detects the force acting on the robot hand 300 by using the torque sensors 291 to 296 incorporated in the robot arm 200 has been described. In the second embodiment, a robot arm 200A includes a six-axis force sensor 290A instead of the torque sensors. The other elements of the robot arm 200A are substantially the same as those of the robot arm 200 of the first embodiment, and therefore description thereof will be omitted.

The force sensor 290A is fixed to the link 216. That is, the force sensor 290A is disposed between the hand body 301 of the robot hand 300 and the link 216. The force sensor 290A is a sensor that supports the robot hand 300 and outputs a signal corresponding to translational forces acting on the robot hand 300 in directions of three axes and rotational forces about the three axes. The three axes are the α axis, β axis, and γ axis. In the second embodiment, the control apparatus 400 detects the force acting on the robot hand 300 by using the force sensor 290A.

Figure 7:
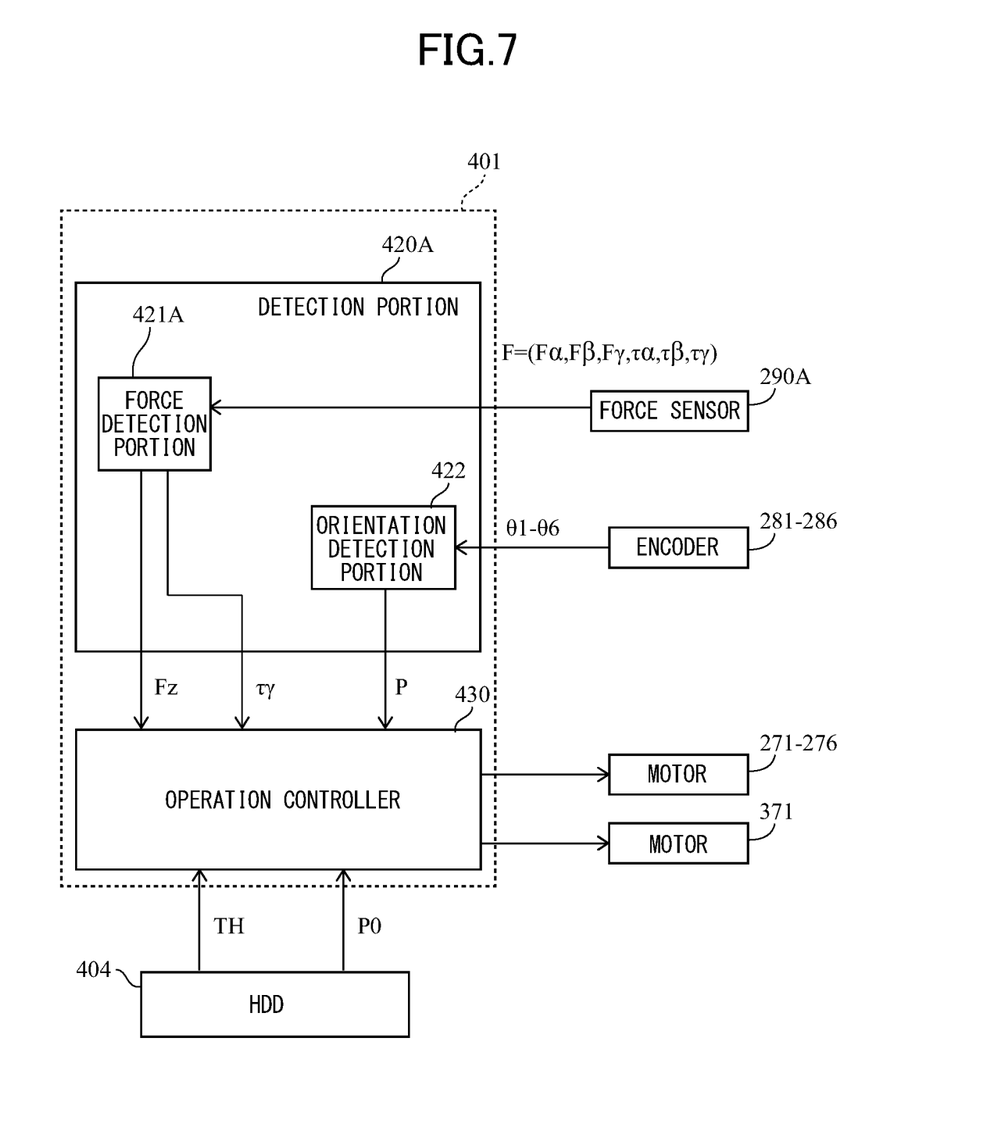
FIG. 7 is a block diagram for describing functions of a control apparatus according to the second embodiment.

FIG. 7 is a block diagram for describing functions of the control apparatus 400 according to the second embodiment. The CPU 401 illustrated in FIG. 2 executes the program 411, and thus functions as a detection portion 420A and the operation controller 430 illustrated in FIG. 7. To be noted, although a case where the functions of the detection portion 420A and the operation controller 430 are realized by the single CPU 401 will be described, the functions of the detection portion 420A and the operation controller 430 may be realized by a plurality of CPUs. In addition, although a case where the CPU 401 realizes the functions of the detection portion 420A and the operation controller 430 with software will be described, the detection portion 420A and the operation controller 430 may be realized by a circuit configuration, that is, a hardware configuration. In addition, FIG. 7 is a diagram for describing the flow of control, and illustration of the drivers is omitted. The detection portion 420A includes a force detection portion 421A and the orientation detection portion 422.

The orientation detection portion 422 detects the orientation P of the robot arm 200A as described in the first embodiment. The force detection portion 421A detects the force F on the basis of the signal from the force sensor 290A. In the second embodiment, the detection of the force F involves computation. The force F is a six-dimensional force vector in the αβγ coordinate system, and includes three translational forces Fα, Fβ, and Fγ in the respective axes α, β, and γ, and three rotational forces about the respective axes α, β, and γ, that is, the three torques τα, τβ, and τγ.

The force detection portion 421A detects the force Fz acting on the robot hand 300 in the gravity direction G on the basis of the information of the force F. To be noted, if the robot arm 200A is controlled to the predetermined orientation P0, the force Fz in the gravity direction G is the force Fγ. When the robot arm 200A is in the predetermined orientation P0, the other forces than the force Fz are 0 if no external force is applied to the robot 110A.

The detection portion 420A outputs the information of the orientation P of the robot arm 200A, the information of the torque tγ acting on the robot hand 300, and the information of the force Fz acting on the robot hand 300 in the gravity direction G to the operation controller 430.

The operation controller 430 and the detection portion 420A executes the control method illustrated in FIG. 5 described in the first embodiment. Therefore, also in the second embodiment, the workpiece W is released from the robot hand 300 by just the operator A illustrated in FIG. 3A performing a simple operation of twisting the robot hand 300 while supporting the workpiece W. Therefore, even when the operator A cannot use either of the hands, the operator A can easily notify the control apparatus 400 that the operator A is ready for receiving the workpiece W without performing an operation such as pushing a button. The control apparatus 400 can reliably pass the workpiece W from the robot 110A to the operator A by using the operation on the workpiece W by the operator A as a trigger for opening the robot hand 300. Further, since the operation of passing the workpiece W is performed in response to the operation by the operator A, an additional waiting time does not have to be provided, and therefore the takt time of the operation of passing the workpiece W can be shortened.

Third Embodiment

Figure 8:
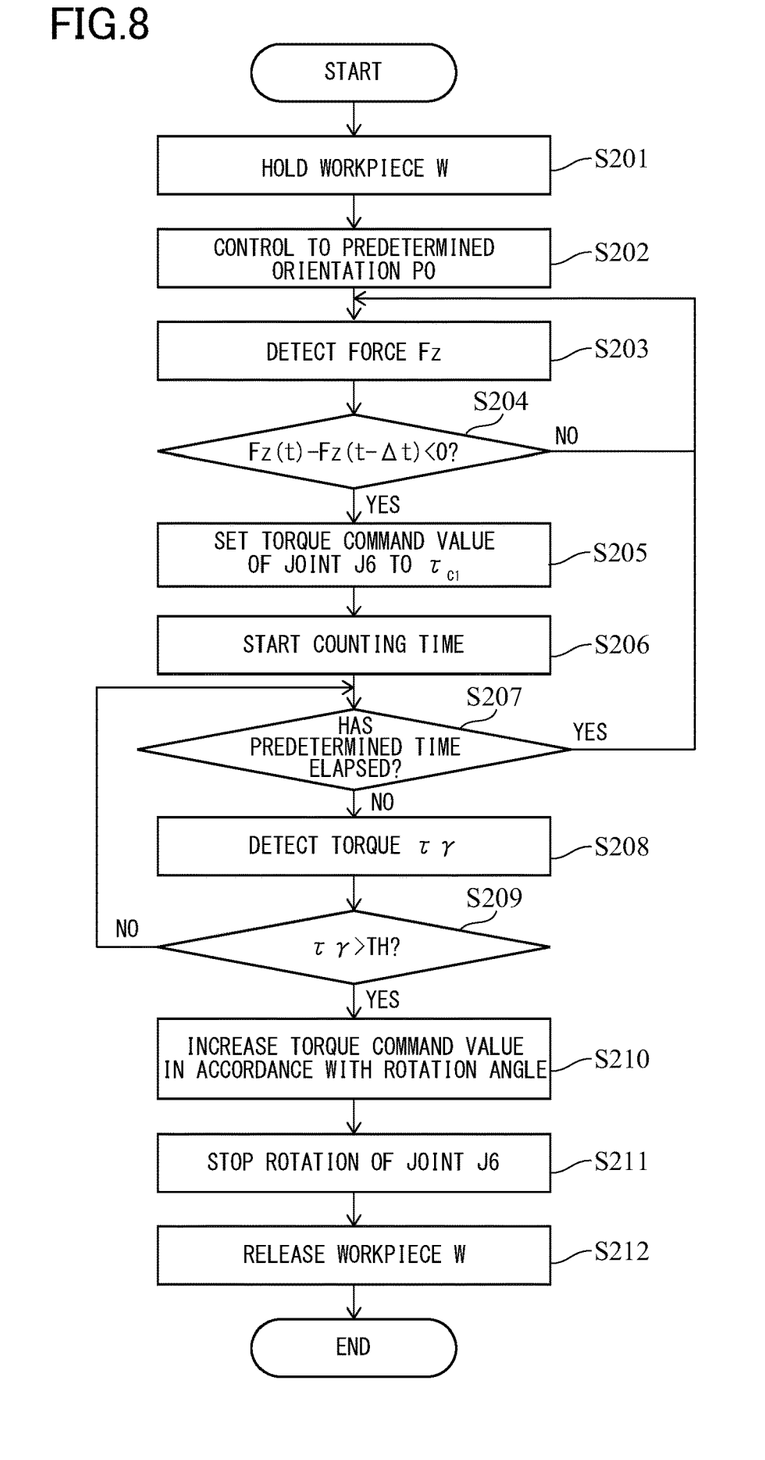
FIG. 8 is a flowchart of a control method according to a third embodiment.

Next, a third embodiment will be described. FIG. 8 is a flowchart of a control method according to the third embodiment. In the third embodiment the configuration of the robot apparatus is the same as in the first embodiment, and the control method of the robot by the control apparatus is different. Therefore, in the description of the third embodiment, the description of the apparatus configuration is omitted as appropriate with reference to FIGS. 1 to 4. In addition, in the flowchart illustrated in FIG. 8, description of steps of in which substantially the same processing is performed as in the steps of the flowchart illustrated in FIG. 5 will be omitted.

The CPU 401 illustrated in FIG. 2 and serving as an example of a controller executes the program 411, and thus functions as the detection portion 420 and the operation controller 430 illustrated in FIG. 4. In FIG. 8, the processing of steps S201 to S204 is the same as the processing of steps S101 to S104 illustrated in FIG. 5.

In the third embodiment, in step S205, the operation controller 430 switches the control of the robot arm 200 from the position control to force control. In step S205, the operation controller 430 sets the torque command value corresponding to the joint J6 of the robot arm 200 to a value $\tau_{C1}$ that is a sufficiently small value. This enables the robot hand 300 to, when the torque $t\gamma$ is applied in the rotation direction $R\gamma$ illustrated in FIG. 3B, rotate in the rotation direction $R\gamma$ in which the torque $t\gamma$ is applied. That is, the operation controller 430 controls the robot arm 200 such that the robot hand 300 rotates in accordance with the torque Ty applied to the robot hand 300.

In FIG. 8, the processing of steps S206 to S209 is the same as the processing of steps S105 to S108 illustrated in FIG. 5. To be noted, in the third embodiment, the value $\tau_{C1}$ is equal to the threshold value TH.

Figure 9:
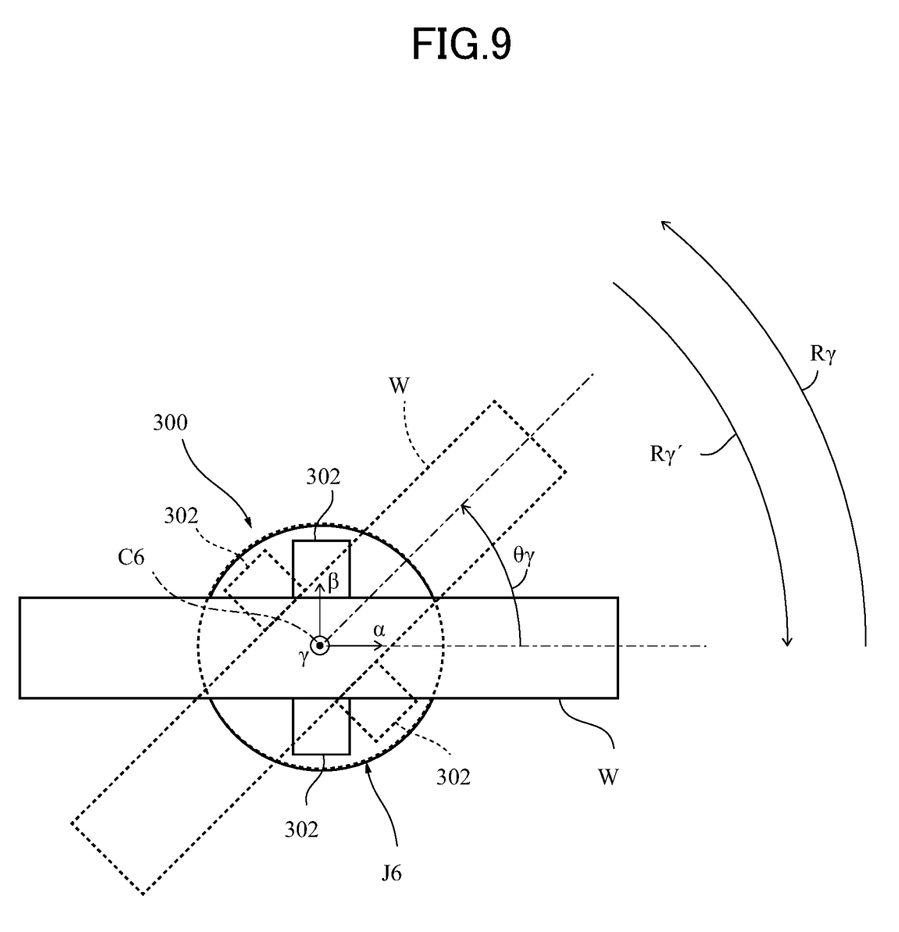
FIG. 9 is an explanatory diagram of a rotation operation of a robot hand according to the third embodiment.

In the case where the torque $t\gamma$ exceeds the threshold value TH, that is, in the case where $t\gamma>$TH holds and the result of step S209 is YES, in step S210, the operation controller 430 increases the torque command value corresponding to the joint J6 from the value $\tau_{C1}$ as the rotation angle increases. FIG. 9 is an explanatory diagram of the rotation operation of the robot hand 300 according to the third embodiment. To be noted, in FIG. 9, the robot hand 300 and the workpiece W before the rotation are indicated by solid lines, and the robot hand 300 and the workpiece W after the rotation are indicated by broken lines.

The processing of step S210 will be described in detail. The operation controller 430 controls the robot arm 200 so as to increase a torque applied to the robot hand 300 in a direction $R\gamma'$, which is opposite to the rotation direction $R\gamma$ of the robot hand 300 according to the torque $t\gamma$, as the robot hand 300 rotates more in accordance with the torque $t\gamma$. At this time, the operation controller 430 increases the torque command value in a range equal to or below a preset upper limit value $\tau_{C2}$ as the rotation angle of the robot hand 300 in the rotation direction $R\gamma$ increases. Here, in the third embodiment, a relationship of $\tau_{C1}<\tau_{C2}$ is satisfied. As a result of this, when a rotational force is applied to the robot hand 300 by the operator, the operation controller 430 can give the operator an impression that it gradually becomes harder to rotate the robot hand 300 as the robot hand 300 rotates more in the rotation direction $R\gamma$.

In the case where the robot hand 300 has rotated by a predetermined angle $\gamma$ in accordance with the torque $t\gamma$, the operation controller 430 controls the robot arm 200 in step S211 so as to stop the rotation of the robot hand 300. That is, the operation controller 430 stops the rotation of the joint J6 of the robot arm 200. Specifically, in the case where the joint J6 has rotated by the predetermined angle $\theta\gamma$, the operation controller 430 stops the rotation of the joint J6 by switching the control of the joint J6 of the robot arm 200 from the torque control to the position control.

According to the processing of steps S210 and S211 described above, particularly step S211, the operator can recognize that the robot hand 300 is about to release the workpiece W. To be noted, in step S211, the operation controller 430 may control the robot arm 200 such that the robot hand 300 quickly vibrates when stopping the rotation of the robot hand 300 after the robot hand 300 has rotated by a predetermined angle.

After stopping the rotation of the robot hand 300, the operation controller 430 controls the motor 371 of the robot hand 300 in step S212 such that the robot hand 300 releases the workpiece W. The series of processing from step S205 to step S212 serve as a control process.

As described above, according to the third embodiment, the workpiece W is released from the robot hand 300 by just the operator A performing a simple operation of twisting the robot hand 300 in the state of supporting the workpiece W similarly to the first embodiment. Therefore, even when the operator A cannot use either of the hands, the operator A can easily notify the control apparatus 400 that the operator A is ready for receiving the workpiece W without performing an operation such as pushing a button. The control apparatus 400 can reliably pass the workpiece W from the robot 110 to the operator A by using the operation on the workpiece W by the operator A as a trigger for opening the robot hand 300. Further, since the operation of passing the workpiece W is performed in response to the operation by the operator A, an additional waiting time does not have to be provided, and therefore the takt time of the operation of passing the workpiece W can be shortened.

To be noted, although a case where the robot arm has the same configuration as in the first embodiment has been described in the third embodiment, the configuration is not limited to this, and the robot arm may have the same configuration as in the second embodiment.

The present invention should not be limited to the embodiments described above, and can be modified in many ways within the technical concept of the present invention. In addition, the effects described in the embodiments are merely enumeration of most preferable effects that can be achieved by the present invention, and the effects of the present invention are not limited to those described in the embodiments.

Although a case where the robot arm is a vertically articulated robot arm has been described in the first to third embodiments, the configuration is not limited to this. Possible examples of the robot arm include various robot arms such as horizontally articulated robot arms, parallel link robot arms, and orthogonal robots.

Although a case where the predetermined orientation P0 of the robot arm is an orientation in which the robot hand is directed vertically downward has been described in the first to third embodiments, the configuration is not limited to this. For example, the predetermined orientation of the robot arm may be an orientation in which the robot hand is inclined with respect to the gravity direction, or an orientation in which the robot hand is directed vertically upward. In either orientation, the force acting on the robot hand in the gravity direction can be detected.

Although a case where the force Fz is detected in step S103 as illustrated in FIG. 5 has been described in the first embodiment, the configuration is not limited to this, and the processing of steps S103 and S104 may be omitted. Similarly, although a case where the force Fz is detected in step S203 has been described in the third embodiment, the configuration is not limited to this, and the processing of steps S203 and S204 may be omitted.

In addition, although a case where an interface apparatus is constituted by the control apparatus 400 has been described in the various embodiments described above, the configuration is not limited to this. For example, the interface apparatus may be constituted by an end effector incorporating a microcomputer including a CPU capable of realizing the various embodiments described above. In this case, the command to release the workpiece in response to the torque applied to the end effector by the operator may be input to the microcomputer.

In addition, although a case where the workpiece is passed from the robot apparatus 100 to the operator has been described as an example in the various embodiments described above, this passing of workpiece may be a part of a process of manufacturing a product. For example, the process of manufacturing a product may be a process of causing the robot apparatus 100 to hold a first member and causing the robot apparatus 100 to mount the first member on a second member. In the process of manufacturing the product, the workpiece to be passed from the robot apparatus 100 to the operator may be the manufactured product. In addition, the workpiece passed from the robot apparatus 100 to the operator may be a member used for the manufacture of the product, for example, the first member or the second member.

In addition, the various embodiments described above are applicable to machines capable of automatically performing operations of extension/contraction, bending/spreading, vertical movement, horizontal movement, or pivoting movement, or a combination of these operations on the basis of information in a storage device provided in a control apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-028370, filed Feb. 21, 2020, which is hereby incorporated by reference herein in its entirety.

What is claimed is:

1. A robot apparatus comprising:
   a robot arm;
   an end effector provided in the robot arm and configured to hold a workpiece; and
   a controller configured to perform a control process for controlling the end effector to release the workpiece, the controller being configured to perform the control process in a case where an operation is performed within a predetermined time to change an orientation of the workpiece with respect to the end effector while the workpiece is supported by a user after a force in a gravity direction acting on the end effector from the workpiece decreases as a result of the user supporting the workpiece that is being held by the end effector.

2. The robot apparatus according to claim 1, wherein the controller is notified that the user has performed the operation of changing the orientation of the workpiece with respect to the end effector on the basis of a torque acting on the end effector via the workpiece due to the user performing the operation of changing the orientation the workpiece, and
   wherein the controller performs the control process in a case where (i) the workpiece is in the still state, (ii) the force in the gravity direction decreases, and (iii) the torque has exceeded a predetermined value.

3. The robot apparatus according to claim 1, wherein, in the control process, the controller controls the robot arm such that the end effector rotates in accordance with a force acting on the end effector due to the user performing the operation of changing the orientation of the workpiece.

4. The robot apparatus according to claim 3, wherein, in the control process, the controller controls the robot arm such that a second torque applied to the end effector in a direction opposite to a rotation direction of the end effector according to a first torque increases as a rotation angle of the end effector increases in accordance with the force acting on the end effector due to the user performing the operation of changing the orientation of the workpiece.

5. The robot apparatus according to claim 3, wherein, in the control process, the controller controls the robot arm to stop rotation of the end effector in a case where the end effector has rotated to a predetermined position in accordance with the force acting on the end effector due to the user performing the operation of changing the orientation of the workpiece.

6. The robot apparatus according to claim 5, wherein, in the control process, the controller controls the end effector to release the workpiece after the rotation of the end effector is stopped at the predetermined position.

7. The robot apparatus according to claim 6, wherein, in the control process, the controller is capable of switching between a position control and a force control,
wherein the position control is a control of the robot arm to cause the end effector to release the workpiece in a case where the end effector has rotated to the predetermined position in accordance with a force acting on the end effector due to the user performing the operation of changing the orientation of the workpiece, and
wherein the force control is a control of the robot arm to cause the end effector to release the workpiece in a case where a rotational torque acting on the end effector has exceeded a predetermined value in accordance with the force acting on the end effector due to the user performing the operation of changing the orientation of the workpiece.

8. The robot apparatus according to claim 1, wherein the robot arm includes a sensor configured to output a signal corresponding to the force acting on the end effector due to the user performing the operation of changing the orientation of the workpiece, and
wherein the controller obtains information about the force acting on the end effector due to the user performing the operation of changing the orientation of the workpiece on a basis of the signal output from the sensor.

9. The robot apparatus according to claim 1, wherein the robot arm includes a plurality of joints and a plurality of sensors each corresponding to one of the plurality of joints,
wherein each of the plurality of sensors is configured to output a signal corresponding to a torque acting on the corresponding one of the plurality of joints, and
wherein the controller is configured to obtain information of the force in the gravity direction on a basis of the signals output from the plurality of sensors.

10. The robot apparatus according to claim 1, wherein the robot arm includes a sensor configured to support the end effector and output a signal corresponding to translational forces in three axes and rotational forces about the three axes that act on the end effector, and
wherein the controller is configured to obtain information of the force in the gravity direction on a basis of the signal output from the sensor.

11. A manufacturing method for manufacturing a product by using the robot apparatus according to claim 1, the manufacturing method comprising:
controlling, by the controller, the end effector to hold a first member;
controlling, by the controller, the robot arm and the end effector to manufacture the product by mounting the first member held by the end effector on a second member; and
controlling, by the controller, the end effector to release the product by executing the control process with the end effector holding the product.

12. The robot apparatus according to claim 1, wherein the controller is configured to be notified that the user has performed the operation of changing the orientation of the workpiece with respect to the end effector on a basis of a force acting on the end effector due to the user performing the operation of changing the orientation of the workpiece.

13. The robot apparatus according to claim 12, wherein the force acting on the end effector due to the user performing the operation of changing the orientation of the workpiece is applied to the end effector by the user performing the operation of changing the orientation of the workpiece while supporting the workpiece.

14. The robot apparatus according to claim 1, wherein the controller is configured to perform the control process in a case where the user supports the workpiece with two hands and the user has performed the operation of changing the orientation of the workpiece with respect to the end effector with the two hands while the workpiece is supported with the two hands.

15. The robot apparatus according to claim 1, wherein the controller is configured to perform the control process in a case where the controller is notified that the user has performed the operation of changing the orientation of the workpiece in terms of a direction orthogonal to a direction in which the end effector holds the workpiece.

16. The robot apparatus according to claim 1, wherein the controller is configured to perform the control process while maintaining the robot arm in a predetermined orientation.

17. The robot apparatus according to claim 16, wherein the controller is configured to maintain the robot arm in the predetermined orientation during the control process even if an external force is applied to the robot arm.

18. The robot apparatus according to claim 16, wherein the controller is configured to maintain the robot arm in the predetermined orientation during the control process even if the operation of changing the orientation of the workpiece with respect to the end effector is performed by the user.

19. The robot apparatus according to claim 16, wherein the predetermined orientation is an orientation for the user to recognize that the robot apparatus is ready to pass the workpiece to the user.

20. The robot apparatus according to claim 16, wherein the end effector includes a holding part to hold the workpiece, and
wherein the predetermined orientation is an orientation in which the holding part is on a lower side of the end effector.

21. The robot apparatus according to claim 1, wherein the controller is configured to be notified that the user is ready to receive the workpiece on a basis of the user having performed the operation of changing the orientation of the workpiece with respect to the end effector.

22. The robot apparatus according to claim 1, wherein the controller is configured to determine that the workpiece is supported by the user in a case where the controller detects that the force in the gravity direction acting on the end effector from the workpiece decreases.

23. The robot apparatus according to claim 1, wherein the controller is configured to cause the end effector to vibrate in a case where the user causes the end effector to rotate by a predetermined angle by performing the operation of changing the orientation of the workpiece.

24. The robot apparatus according to claim 1, wherein the operation of changing the orientation of the workpiece with respect to the end effector to be performed by the user includes a case where the end effector does not rotate.

25. The robot apparatus according to claim 1, wherein the operation of changing the orientation of the workpiece is a twisting operation of the workpiece.

26. The robot apparatus according to claim 1, wherein in a case where a torque acting on the end effector via the workpiece by the user does not exceed a threshold value for a predetermined time, the controller does not perform the control process and performs detection of the force in the gravity direction.

27. The robot apparatus according to claim 1, wherein the controller is configured to start timing triggered by the decrease in the force in the gravity direction acting on the end effector from the workpiece when the user supports the workpiece supported by the end effector.

28. An interface apparatus configured to transmit a command to release a workpiece to an end effector holding the workpiece, wherein the command is transmitted in a case where an operation is performed within a predetermined time to change an orientation of the workpiece with respect to the end effector while the workpiece is supported by a user after a force in a gravity direction acting on the end effector from the workpiece decreases as a result of the user supporting the workpiece that is being held by the end effector.

29. A control apparatus configured to control an end effector holding a workpiece to release the workpiece in a case where an operation is performed within a predetermined time to change an orientation of the workpiece with respect to the end effector while the workpiece is supported by a user after a force in a gravity direction acting on the end effector from the workpiece decreases as a result of the user supporting the workpiece that is being held by the end effector.

30. An end effector configured to hold a workpiece, wherein the workpiece is released in a case where an operation is performed within a predetermined time to change an orientation of the workpiece with respect to the end effector while the workpiece is supported by a user after a force in a gravity direction acting on the end effector from the workpiece decreases as a result of the user supporting the workpiece that is being held by the end effector.

31. A control method for controlling an end effector provided in a robot arm and configured to hold a workpiece, the control method comprising:
   causing the end effector to hold the workpiece; and
   controlling the end effector to release the workpiece in a case where an operation is performed within a predetermined time to change an orientation of the workpiece with respect to the end effector while the workpiece is supported by a user after a force in a gravity direction acting on the end effector from the workpiece decreases as a result of the user supporting the workpiece that is being held by the end effector.

32. A non-transitory computer-readable recording medium storing a program for causing the computer to execute the control method according to claim 31.

\* \* \* \* \*